United States Patent [19]

Hayes et al.

[11] Patent Number: 4,529,770
[45] Date of Patent: Jul. 16, 1985

[54] VULCANIZABLE POLYMERIC COMPOSITIONS CONTAINING ZINC DIMETHACRYLATE AND FILLERS

[75] Inventors: Robert A. Hayes, Cuyahoga Falls; Wendell R. Conard, Kent, both of Ohio

[73] Assignee: The Firestone Tire & Rubber Company, Akron, Ohio

[21] Appl. No.: 543,706

[22] Filed: Oct. 20, 1983

Related U.S. Application Data

[63] Continuation-in-part of Ser. No. 456,874, Jan. 10, 1983, abandoned.

[51] Int. Cl.³ .......................... C08K 3/04; C08K 3/34; C08L 33/02
[52] U.S. Cl. .................... 524/445; 524/533
[58] Field of Search ............... 524/445, 533

[56] References Cited

U.S. PATENT DOCUMENTS

| | | | |
|---|---|---|---|
| 3,823,122 | 7/1974 | Schuh et al. | 524/397 |
| 4,056,269 | 11/1977 | Pollitt | 273/218 |
| 4,065,537 | 12/1977 | Miller | 264/143 |
| 4,082,288 | 4/1978 | Martin et al. | 260/998.14 |
| 4,165,877 | 8/1979 | Miller | 273/218 |
| 4,191,671 | 3/1980 | Kataoka et al. | 525/445 |
| 4,192,790 | 3/1980 | McKinstry et al. | 524/397 |
| 4,264,075 | 4/1981 | Miller et al. | 260/998.14 |
| 4,266,772 | 5/1981 | Martin et al. | 260/998.14 |
| 4,305,851 | 12/1981 | Tominaga et al. | 260/998.14 |
| 4,318,875 | 3/1982 | Shrimpton et al. | 525/386 |

FOREIGN PATENT DOCUMENTS 1091818  11/1967  United Kingdom .

OTHER PUBLICATIONS

Derwent Abst. 01001/E01, (12-1981), Sumitomo.
Derwent Abst. 51465 E/25, (5-1982), Sumitomo.
Derwent Abst. 51372 E/25, (5-1982), Sumitomo.
Derwent Abst. 84518 E/40, (8-1982), Sumitomo.

*Primary Examiner*—Herbert J. Lilling
*Attorney, Agent, or Firm*—Frank J. Troy, Sr.

[57] ABSTRACT

Vulcanizable polymeric compositions containing natural rubber or copolymers of conjugated dienes and mono-olefins, small amounts of a zinc dimethacrylate having a surface area of from about 3.7 to about 5.4 $m^2/g$ or more, certain fillers or mixtures of fillers and peroxide curing agents are provided. The use of clay as a filler in combination with the zinc dimethacrylate in certain of the polymeric compositions is particularly advantageous as the combination synergistically enhances the strength of the vulcanized compositions.

12 Claims, No Drawings

VULCANIZABLE POLYMERIC COMPOSITIONS CONTAINING ZINC DIMETHACRYLATE AND FILLERS

CROSS REFERENCES TO RELATED APPLICATIONS

This is a continuation-in-part of U.S. application Ser. No. 456,874, filed Jan. 10, 1983, now abandoned.

BACKGROUND OF THE INVENTION

The invention relates to peroxide vulcanizable polymeric compositions containing combinations of zinc dimethacrylate and various fillers or mixtures of fillers. More particularly, the invention relates to vulcanizable polymeric compositions containing natural rubber or copolymers of conjugated dienes and monoolefins, small amounts of a zinc dimethacrylate having specified surface area, various fillers or mixtures of fillers and peroxide curing agents. The invention further relates to certain vulcanizable polymeric compositions containing combinations of zinc dimethacrylate and clay which synergistically enhance the strength of the vulcanized compositions.

U.S. Pat. No. 3,823,122 relates to curable SBR or neoprene elastomer compositions containing from 1 to 15 parts by weight per 100 parts by weight of elastomer of a substituted acrylic acid or acid salt, with the preferred acid salt indicated to be zinc methacrylate. Elastomer compositions which are disclosed include a reinforcing filler such as carbon black but do not include a peroxide curing agent.

U.S. Pat. No. 4,082,288 discloses free-radical crosslinkable elastomer compositions containing a peroxide crosslinkable elastomer, from 10 to about 60 parts by weight per 100 parts by weight of elastomer of basic zinc methacrylate, a peroxide curing agent and optionally reinforcing fillers such as litharge or zinc oxide in amounts of 2 to 10 parts by weight per 100 parts by weight of elastomer.

U.S. Pat. No. 4,191,671 relates to curable rubber compositions comprising (A) a diene elastomer, (B) an alpha, beta ethylenically unsaturated carboxylic acid, wherein the ratio by weight of component (A) to component (B) is 87/13 to 55/45, (C) a divalent metal compound being present in quantities of 50 to 150 parts by weight per 100 parts by weight of component (B), and (D) an organic peroxide being present in quantities of 0.3 to 5.0 parts by weight per 100 parts by weight of the combined weight of components (A) and (B). The compositions may additionally contain an unpolymerizable carboxylic acid, carbon black in amounts of less than 50 parts by weight per 100 parts by weight of elastomer and an amine and/or phenol compound.

U.S. Pat. No. 4,192,790 relates to elastomer compositions having reduced Mooney viscosity in the compounded state. The Mooney viscosity of the elastomer compositions are reduced by the incorporation therein of from 0.1 to 7.0 parts by weight of basic zinc methacrylate per 100 parts by weight of elastomer. In addition to the basic zinc methacrylate, the elastomer compositions contain various elastomers or elastomer blends, an inorganic particulate filler such as silica, calcium carbonate, silicates such as clay, hydrated aluminum silicate and optionally carbon black (20 to 150 parts per 100 parts elastomer) and curing agents such as peroxide curatives.

U.S. Pat. No. 4,266,772 relates to solid golf balls formed from a curable elastomer composition comprising a free-radical crosslinkable elastomer, especially a peroxide crosslinkable elastomer, basic zinc methacrylate (about 10 to about 60 parts by weight per 100 parts by weight of elastomer) and a curing agent such as a peroxide curing agent. The compositions may optionally contain reinforcing fillers such as litharge or zinc oxide in amounts of for example 2 to 10 parts per 100 parts of elastomer.

British Pat. No. 1,091,818 discloses vulcanizable compositions comprising alpha-olefin polymers and a curing system consisting of metal salts of acrylic acid or methacrylic acid in amounts of from 1 to 10 parts of metal salt per 100 parts of polymer and an organic peroxide. The compositions may additionally contain reinforcing agents and fillers such as carbon blacks, metal oxides, clays and silica pigments.

British Pat. No. 2,042,553 discloses crosslinked cellular elastomeric compositions which are formed from an elastomer composition comprising a natural and/or synthetic rubber, a crosslinking agent such as a peroxide, a monomeric metallic salt such as zinc dimethacrylate, zinc diacrylate, preferably basic zinc methacrylate and a blowing agent. The compositions may additionally contain fillers such as carbon black or titanium dioxide and other known compounding additives.

While the aforementioned patents describe compositions which are similar in several respects to the compositions of the present invention, they fail to disclose or suggest two major elements of the present compositions. Thus, these patents fail to recognize the importance of using a zinc dimethacrylate having a surface area of from about 3.7 to about 5.4 $m^2/g$ or more. Additionally, the patents neither disclose nor suggest compositions containing synergistic combinations of zinc dimethacrylate and clay.

SUMMARY OF THE INVENTION

In accordance with the invention, vulcanizable polymeric compositions which contain certain rubbery polymers, a zinc dimethacrylate of specified surface area, various fillers or filler mixtures and a peroxide curing agent are provided. The compositions comprise: (a) a rubbery polymer selected from the group consisting of natural rubber and a copolymer of a conjugated diene and at least one monoolefin; (b) from about 2.5 to about 20 parts by weight per 100 parts by weight of rubbery polymer of a zinc dimethacrylate having a surface area of from about 3.7 to about 5.4 $m^2/g$ or more; (c) from about 30 to about 70 parts by weight per 100 parts by weight of a filler selected from the group consisting of carbon black, clay, silica, mixtures of carbon black and clay and mixtures of clay and silica and (d) a cure effective amount of a peroxide curing agent.

In a preferred embodiment of the invention, vulcanizable polymeric compositions containing natural rubber or a copolymer of a conjugated diene and a vinyl aromatic hydrocarbon and synergistic combinations of zinc dimethacrylate and clay are provided. The combination of zinc dimethacrylate and clay in these compositions have been found to synergistically enhance the strength of the cured compositions.

DETAILED DESCRIPTION OF THE INVENTION

Rubbery polymers which may be utilized in the compositions of the invention include natural rubber and copolymers of a conjugated diene and at least one monoolefin.

The copolymers of conjugated dienes may be derived from conjugated dienes such as 1,3-butadiene, 2-methyl-1,3-butadiene(isoprene), 2,3-dimethyl-1,3-butadiene, 1,3-pentadiene, 1,3-hexadiene and the like, as well as mixtures of the foregoing dienes. The preferred conjugated diene is 1,3-butadiene.

The copolymers may be derived from various monoolefinic monomers including vinyl aromatic monomers such as styrene, alpha-methyl styrene, vinyl naphthalene, vinyl pyridine and the like; alkyl acrylates or methacrylates such as methyl acrylate, ethyl acrylate, butyl acrylate, methyl methacrylate, butyl methacrylate and the like; unsaturated nitriles such as acrylonitrile, methacrylonitrile and the like and vinyl halides such as vinyl chloride, vinylidene chloride and the like as well as mixtures of the foregoing monoolefins. The copolymers may contain up to 50 percent by weight of the monoolefin based upon total weight of copolymer. The preferred copolymer is a copolymer of a conjugated diene, especially butadiene, and a vinyl aromatic hydrocarbon, especially styrene. Typical of styrene-butadiene rubbery copolymers which may be utilized is a styrene-butadiene copolymer having a bound styrene content of 23.5%, a viscosity (ML4 at 212° F.) of 50 and a specific gravity of 0.94 available under the designation S1502 from The Firestone Tire & Rubber Company.

The above-described copolymers of conjugated dienes and their method of preparation are well known in the rubber and polymer arts. Many of the polymers and copolymers are commercially available.

The zinc dimethacrylate employed in the compositions is a zinc dimethacrylate powder having a surface area of from about 3.7 to about 5.4 square meters per gram ($m^2/g$) or more. A zinc dimethacrylate powder having the required surface area can be prepared by reacting under agitation zinc oxide and methacrylic acid in an amount of from about 0.5 to 0.6 moles of zinc oxide per mole of methacrylic acid in a liquid aliphatic hydrocarbon dispersing medium to produce particles of zinc dimethacrylate in the liquid medium, recovering the particles of zinc dimethacrylate from the liquid medium and drying the particles of zinc dimethacrylate. A detailed description of the method of preparing the zinc dimethacrylate powder is disclosed in copending application Ser. No. 543,705, now U.S. Pat. No. 4,500,466 filed concurrently herewith in the names of Robert A. Hayes and Wendell R. Conrad, commonly assigned to the assignee of the present application, the disclosure of which is incorporated herein by reference. A preferred zinc dimethacrylate powder is one having a surface area of 4.5 $m^2/g$ prepared in accordance with the procedure set forth in Example 3 of the aforementioned copending application.

Amounts of zinc dimethacrylate which may be utilized in the compositions depend upon the type rubbery polymer, the type and amount of filler or mixture of fillers, and the properties desired in the cured or vulcanized composition. In general, the zinc dimethacrylate can be used in amounts of from about 2.5 to about 20 parts by weight per 100 parts by weight of rubbery polymer.

Fillers or mixtures of fillers which may be utilized in the compositions include carbon black, clay, silica, mixtures of carbon black and clay and mixtures of clay and silica.

Amounts of such fillers or mixtures of fillers which may be utilized in the compositions depend upon the type rubbery polymer, the amount of zinc dimethacrylate and the properties desired in the cured or vulcanized composition. In general, the fillers or mixtures of fillers can be used in amounts of from about 30 to about 70 parts by weight per 100 parts by weight of rubbery polymer.

Peroxide curing agents which may be used in the compositions include organic peroxides such as dicumyl peroxide, bis-(t-butyl peroxy)diisopropyl benzene, t-butyl perbenzoate, di-t-butyl peroxide, 2,5-dimethyl-2,5-di-5-butyl peroxy-hexane and the like. The preferred peroxide curing agents are bis-(t-butyl peroxy)-diisopropyl benzene and dicumyl peroxide.

Amounts of peroxide curing agents included in the compositions will depend upon the type rubber utilized and may broadly be stated as cure effective amounts. In general, such amounts may range from about 0.2 to about 2.0 parts by weight per 100 parts by weight of rubbery polymer. The compositions may optionally contain other additives commonly utilized in rubber compositions such as process and extender oils, antioxidants, waxes and the like.

As indicated above, in a preferred embodiment of the compositions of the invention, vulcanizable polymeric compositions are provided which contain a rubbery polymer selected from natural rubber or a copolymer of a conjugated diene and a vinyl aromatic hydrocarbon in combination with the zinc dimethacrylate and clay. A surprising and unexpected aspect of such compositions has been the discovery that the combination of clay and zinc dimethacrylate appears to synergistically enhance the strength of the vulcanized composition. Thus, as will be seen in Examples 7-17 below, the effect of the combination of zinc dimethacrylate and clay on the cured strength of these compositions is not merely additive of the separate effects of the zinc dimethacrylate alone and clay alone but is in fact much greater. This is especially surprising because clay itself provides little if any reinforcement to rubber compounds.

The following examples are submitted for the purpose of further illustrating the nature of the present invention and are not intended as a limitation on the scope thereof. Parts and percentages referred to in the examples and throughout the specification are by weight unless otherwise indicated.

EXAMPLES 1-3

In these examples, vulcanizable polymeric compositions of the invention containing styrene-butadiene rubber, zinc dimethacrylate, HAF carbon black and a peroxide curing agent were prepared. A composition containing the same components except for the zinc dimethacrylate component was also prepared to serve as a control. The compositions were mixed on an electric mill with no external heat added. The mixed compositions were cured and then tested for stress-strain properties. Composition formulations, curing conditions and stress-strain properties are shown in Table I.

TABLE I

| | parts by weight Example No. | | | |
|---|---|---|---|---|
| | Control | 1 | 2 | 3 |
| Ingredients | | | | |
| S1502[a] | 100.0 | 100.0 | 100.0 | 100.0 |
| Zinc dimethacrylate | — | 12.5 | 10.0 | 20.0 |

TABLE I-continued

|  | parts by weight Example No. | | | |
| --- | --- | --- | --- | --- |
|  | Control | 1 | 2 | 3 |
| HAF black | 50.0 | 37.5 | 50.0 | 50.0 |
| Vulcup R[b] | 0.2 | 0.2 | 0.2 | 0.2 |
|  | 150.2 | 150.2 | 160.2 | 170.2 |
| Stress-Strain (cure: 20' at 160° C.) | | | | |
| 300% modulus, MPa* | 1.8 | 3.7 | 9.7 | 5.2 |
| Tensile, MPa | 8.9 | 13.1 | 19.8 | 9.7 |
| Elongation, % | 1265 | 1071 | 537 | 579 |

*MPa means mega pascals
[a] a styrene-butadiene rubber containing 23.5% bound styrene having a viscosity (ML-4 at 212° F.) of 50 and a specific gravity of 0.94 available from The Firestone Tire & Rubber Company
[b] bis-(t-butyl peroxy) diisopropyl benzene

EXAMPLES 4-6

In these examples, vulcanizable polymeric compositions of the invention containing styrene-butadiene rubber, zinc dimethacrylate, silica, an antioxidant and a peroxide curing agent were prepared. A composition containing the same components except for the zinc dimethacrylate component was also prepared to serve as a control.

The above compositions were mixed on an electric mill with no external heat added. The mixed compositions were cured and then tested for stress-strain properties. Composition formulations, curing conditions and stress-strain properties are shown in Table II.

TABLE II

|  | parts by weight Example No. | | | |
| --- | --- | --- | --- | --- |
|  | Control | 4 | 5 | 6 |
| Ingredients | | | | |
| S1502 | 100.0 | 100.0 | 100.0 | 100.0 |
| Zinc dimethacrylate | — | 10.0 | 15.0 | 20.0 |
| Hi-Sil 233[a] | 50.0 | 50.0 | 40.0 | 50.0 |
| Polygard[b] | 2.0 | 2.0 | 2.0 | 2.0 |
| Vulcup R | 0.4 | 0.4 | 0.4 | 0.4 |
|  | 152.4 | 162.4 | 157.4 | 172.4 |
| Stress-Strain (cure: 20' at 160° C.) | | | | |
| 300% modulus, MPa | 5.4 | 7.4 | 9.2 | 10.7 |
| Tensile, MPa | 14.2 | 17.6 | 21.3 | 19.2 |
| Elongation, % | 591 | 649 | 527 | 543 |

[a] a precipitated hydrated silica having a specific gravity of 2.0 available from PPG Industries, Inc.
[b] a tri-(nonylated phenyl) phosphite antioxidant having a specific gravity of 0.99 available from Uniroyal Examples 7-17 which follow illustrate vulcanizable polymeric compositions of the invention containing natural rubber and styrene-butadiene rubber and synergistic combinations of zinc dimethacrylate and clay.

EXAMPLES 7-10

In these examples, vulcanizable polymeric compositions containing styrene-butadiene rubber, zinc dimethacrylate, clay, a peroxide curing agent and an antioxidant were prepared, mixed, cured and tested for stress-strain properties as in Examples 1-6. For comparative purposes, control compositions designated A and B containing zinc dimethacrylate alone (A) and clay alone (B) were prepared, mixed, cured and tested for stress-strain properties using substantially the same procedure. Composition formulations, curing conditions and stress-strain properties are shown in Table III.

TABLE III

|  | Example No. | | | | | |
| --- | --- | --- | --- | --- | --- | --- |
|  | A | B | 7 | 8 | 9 | 10 |
| Ingredients | | | | | | |
| S1502 | 100.00 | 100.00 | 100.00 | 100.00 | 100.00 | 100.00 |
| Zinc dimethacrylate | 10.00 | — | 2.50 | 5.00 | 7.50 | 10.00 |
| Clay | — | 60.00 | 60.00 | 60.00 | 60.00 | 60.00 |
| Polygard | 2.00 | 2.00 | 2.00 | 2.00 | 2.00 | 2.00 |
| Vulcup R | 0.50 | 0.50 | 0.50 | 0.50 | 0.50 | 0.50 |
|  | 112.50 | 162.50 | 165.00 | 167.50 | 170.00 | 172.50 |
| Stress-Strain (cure: 20' at 160° C.) | | | | | | |
| 300% modulus, MPa (200%) | 2.44 | 1.60 | 4.46 | 6.81 | 8.34 | 10.00 |
| Tensile, MPa | 3.23 | 3.53 | 10.70 | 12.90 | 16.70 | 16.20 |
| Elongation, % | 252 | 903 | 725 | 598 | 612 | 513 |

As can be seen from the above data, the combination of zinc dimethacrylate and clay enhances the cured strength of compositions of the invention to levels which are not merely additive of the combined effects of the separate components alone, thereby indicating that the combination produces a synergistic effect on such properties. Thus, for example, if the effects of the combination were merely additive of the effects of the separate components, one would expect a composition containing 10 parts of zinc dimethacrylate and 60 parts of clay to exhibit a cured tensile strength of about 6.8 MPa (i.e., the combined tensile strengths of Examples A and B).

However, as can be seen from Example 10, the combination actually produces a cured tensile strength of 16.2 MPa thereby indicating that the combination synergistically enhances the cured strength of the composition. One would also expect that combinations containing less than 10 parts of zinc dimethacrylate and 60 parts of clay would exhibit cured tensile strengths lower than 6.8 MPa. However, as can be seen from Examples 7-9, compositions containing 2.5, 5.0 and 7.5 parts of zinc dimethacrylate in combination with 60 parts of clay exhibit cured tensile strengths of 10.7, 12.9 and 16.7 MPa respectively, thereby indicating that these combinations are also synergistic.

EXAMPLES 11-13

In these examples, vulcanizable polymeric compositions containing styrene-butadiene rubber, variable levels of zinc dimethacrylate and clay, a peroxide curing agent and an antioxidant were prepared, mixed, cured and tested for stress-strain properties as in Examples 1-6. For comparative purposes, control compositions designated Examples C, D and E containing zinc dimethacrylate alone (C and D) and clay alone (E) were prepared, mixed, cured and tested for stress-strain properties using substantially the same procedure. Composition formulations, curing conditions and stress-strain properties are shown in Table IV.

TABLE IV

|  | Example No. | | | | | |
| --- | --- | --- | --- | --- | --- | --- |
|  | C | D | E | 11 | 12 | 13 |
| Ingredients | | | | | | |
| S1502 | 100.00 | 100.00 | 100.00 | 100.00 | 100.00 | 100.00 |
| Zinc dimethacryl- | 10.00 | 20.00 | — | 10.00 | 15.00 | 20.00 |

TABLE IV-continued

| | Example No. | | | | | |
|---|---|---|---|---|---|---|
| | C | D | E | 11 | 12 | 13 |
| ate | | | | | | |
| Clay | — | — | 50.00 | 50.00 | 45.00 | 50.00 |
| Polygard | 2.00 | 2.00 | 2.00 | 2.00 | 2.00 | 2.00 |
| Vulcup R | 0.25 | 0.25 | 0.25 | 0.25 | 0.25 | 0.25 |
| | 112.25 | 122.25 | 152.25 | 162.25 | 162.25 | 172.25 |
| Stress-Strain (cure: 20′ at 160° C.) | | | | | | |
| 300% modulus, MPa | 2.42 | 6.29 | 0.73 | 4.80 | 7.56 | 7.39 |
| Tensile, MPa | 6.48 | 7.67 | 1.38 | 11.30 | 14.7 | 10.60 |
| Elongation, % | 742 | 345 | 995 | 775 | 580 | 482 |

As can be seen from the above data, the combination of zinc dimethacrylate and clay at levels above 10 zinc dimethacrylate and levels below 60 clay also enhances the cured strengths of compositions of the invention to levels which are not merely additive of the combined effects of the separate components alone thereby indicating that these combinations produce a synergistic effect on such properties.

EXAMPLES 14–17

In these examples, vulcanizable polymeric compositions containing natural rubber (NR), zinc dimethacrylate, clay and a peroxide curing agent were prepared, mixed, cured and tested for stress-strain properties as in Examples 1–6. For comparative purposes, control compositions designated Examples F and G containing zinc dimethacrylate alone (F) and clay alone (G) were prepared, mixed, cured and tested for stress-strain properties using substantially the same procedure. Composition formulations, curing conditions and stress-strain properties are shown in Table V.

TABLE V

| | Example No. | | | | | |
|---|---|---|---|---|---|---|
| | F | G | 14 | 15 | 16 | 17 |
| Ingredients | | | | | | |
| NR | 100.00 | 100.00 | 100.00 | 100.00 | 100.00 | 100.00 |
| Zinc dimethacrylate | 10.00 | — | 2.50 | 5.00 | 10.00 | 20.00 |
| Clay | — | 60.00 | 60.00 | 50.00 | 60.00 | 40.00 |
| Vulcup R | 0.50 | 0.50 | 0.50 | 0.50 | 0.50 | 0.50 |
| | 110.50 | 160.50 | 163.00 | 155.50 | 170.50 | 160.50 |
| Stress-Strain (cure: 30′ at 160° C.) | | | | | | |
| 300% modulus, MPa | 2.20 | 2.44 | 10.83 | 10.24 | 12.8 | 20.16 |
| Tensile, MPa | 5.90 | 2.66 | 11.91 | 11.20 | 12.8 | 26.39 |
| Elongation, % | 462 | 316 | 320 | 317 | 300 | 317 |

As can be seen from a comparison of Examples F and G with Example 16, the effect of the combination of 10 parts of zinc dimethacrylate with 60 parts of clay on the cured tensile strength of the composition is not merely additive of the separate effects of the components alone thereby indicating that the combination is synergistic. Thus, if the results were merely additive, one would expect to obtain a tensile of about 8 MPa whereas the actual tensile results for Example 16 are 12.8 MPa.

EXAMPLES 18–19

In these examples, vulcanizable polymeric compositions containing a rubbery nitrile polymer (i.e., a copolymer of butadiene and acrylonitrile defined below), zinc dimethacrylate, clay, a peroxide curing agent and an antioxidant were prepared, mixed, cured and tested for stress-strain properties as in Examples 1–6. For comparative purposes, control compositions designated H, J and K containing clay alone (H) and zinc dimethacrylate alone (J and K) were prepared, mixed, cured and tested for stress-strain properties using substantially the same procedure. Composition formulations, curing conditions and stress-strain properties are shown in Table VI.

TABLE VI

| | Example No. | | | | |
|---|---|---|---|---|---|
| | H | J | K | 18 | 19 |
| Ingredients | | | | | |
| FRN 600[a] | 100.0 | 100.0 | 100.0 | 100.0 | 100.0 |
| Zinc dimethacrylate | — | 5.0 | 10.0 | 5.0 | 10.0 |
| Clay | 60.0 | — | — | 60.0 | 60.0 |
| Polygard | 2.0 | 2.0 | 2.0 | 2.0 | 2.0 |
| Vulcup R | 0.4 | 0.4 | 0.4 | 0.4 | 0.4 |
| | 162.4 | 107.4 | 112.4 | 167.4 | 172.4 |
| Stress-Strain (cure: 20′ at 160° C.) | | | | | |
| 300% modulus, MPa | 3.60 | 2.30 | 3.80 | 5.86 | 8.41 |
| Tensile, MPa | 8.94 | 3.21 | 4.50 | 12.07 | 13.34 |
| Elongation, % | 830 | 390 | 338 | 744 | 576 |

[a] a butadiene-acrylonitrile copolymer having an acrylonitrile content of 32%, a specific gravity of 0.98 and an $ML_4$ at 212° F. of 50–60.

In the above evaluation, the combination of zinc dimethacrylate and clay in a composition containing a butadiene-acrylonitrile copolymer does not appear to synergistically enhance the cured strength of the composition.

EXAMPLES 20–25

In these examples, vulcanizable polymeric compositions containing natural rubber, zinc dimethacrylate, clay, carbon black, a peroxide curing agent and an antioxidant were prepared, mixed, cured and tested for stress-strain properties as in Examples 1–6. Composition formulations, curing conditions and stress-strain properties are shown in Table VII.

TABLE VII

| | Example No. | | | | | |
|---|---|---|---|---|---|---|
| | 20 | 21 | 22 | 23 | 24 | 25 |
| Ingredients | | | | | | |
| NR | 100.0 | 100.0 | 100.0 | 100.0 | 100.0 | 100.0 |
| Zinc dimethacrylate | 2.0 | 5.0 | 10.0 | 18.0 | 5.0 | 10.0 |
| HAF black | 20.0 | 30.0 | 25.0 | 20.0 | 30.0 | 30.0 |
| Clay | 30.0 | 10.0 | 10.0 | 5.0 | 20.0 | 20.0 |
| Antioxidant[a] | 2.0 | 2.0 | 2.0 | 2.0 | 2.0 | 2.0 |
| Vulcup R | 1.0 | 1.0 | 1.0 | 1.0 | 1.0 | 1.0 |
| | 155.0 | 148.0 | 148.0 | 146.0 | 158.0 | 163.0 |
| Stress-Strain (cure: 23′ at 166° C.) | | | | | | |
| 200% modulus, MPa | 4.27 | 6.28 | 6.55 | 7.24 | 6.55 | 8.34 |
| Tensile, MPa | 11.86 | 14.20 | 18.55 | 22.83 | 15.59 | 19.72 |
| Elongation, % | 360 | 320 | 360 | 400 | 330 | 350 |

[a] N—(1,3-dimethylbutyl)-N′—phenyl-para-phenylene diamine.

EXAMPLES 26–28

In these examples, vulcanizable polymeric compositions containing styrene-butadiene rubber, zinc dimethacrylate, clay, silica, a peroxide curing agent and an antioxidant were prepared, mixed, cured and tested for stress-strain properties as in Examples 1–6. Composition formulations, curing conditions and stress-strain properties are shown in Table VIII.

TABLE VIII

|  | Example No. | | |
| --- | --- | --- | --- |
|  | 26 | 27 | 28 |
| Ingredients |  |  |  |
| S1502 | 100.0 | 100.0 | 100.0 |
| Zinc dimethacrylate | 10.0 | 10.0 | 10.0 |
| Clay | 50.0 | 40.0 | 30.0 |
| Silica | 10.0 | 20.0 | 30.0 |
| Polygard | 2.0 | 2.0 | 2.0 |
| Vulcup R | 0.5 | 0.5 | 0.5 |
|  | 172.5 | 172.5 | 172.5 |
| Stress-Strain (cure: 20' at 160° C.) |  |  |  |
| 300% modulus, MPa | 9.24 | 8.64 | 7.27 |
| Tensile, MPa | 13.10 | 15.30 | 16.60 |
| Elongation, % | 500 | 581 | 768 |

We claim:

1. Vulcanizable polymeric compositions comprising:
   (a) a rubbery polymer selected from the group consisting of natural rubber and a copolymer of a conjugated diene and at least one monoolefin;
   (b) from about 2.5 to about 20 parts by weight per 100 parts by weight of said rubbery polymer of a zinc dimethacrylate having a surface area of from about 3.7 to about 5.4 $m^2/g$ or more;
   (c) from about 30 to about 70 parts by weight per 100 parts by weight of said rubbery polymer of a filler selected from the group consisting of carbon black, clay, silica, mixtures of carbon black and clay and mixtures of clay and silica; and
   (d) a cure effective amount of a peroxide curing agent.

2. The composition of claim 1 wherein said copolymer contains up to 50 percent by weight of said monoolefin based on total weight of copolymer.

3. The composition of claim 1 wherein said copolymer is a copolymer of a conjugated diene and a vinyl aromatic hydrocarbon.

4. The composition of claim 3 wherein said copolymer is a copolymer of butadiene and styrene.

5. The composition of claim 1 wherein said copolymer is a copolymer of butadiene and acrylonitrile.

6. The composition of claim 1 wherein said zinc dimethacrylate has a surface area of 4.5 $m^2g$.

7. The composition of claim 1 containing from about 0.2 to about 2.0 parts by weight of a peroxide curing agent per 100 parts by weight of said rubbery polymer.

8. The composition of claim 7 wherein said peroxide curing agent is dicumyl peroxide or bis-(t-butyl peroxy)diisopropyl benzene.

9. The composition of claim 1 wherein said rubbery polymer is natural rubber and said copolymer is a copolymer of styrene and butadiene containing 23.5 percent bound styrene.

10. The composition of claim 1 wherein said copolymer is a copolymer of butadiene and acrylonitrile containing 32 percent by weight of acrylonitrile.

11. The composition of claim 1 wherein said rubbery polymer is natural rubber or a copolymer of styrene-butadiene containing 23.5 percent bound styrene and said filler is clay and wherein said combination of zinc dimethacrylate and clay synergistically enhances the strength of the composition upon vulcanization.

12. The composition of claim 11 wherein said peroxide curing agent is bis-(t-butyl peroxy)diisopropyl benzene.

* * * * *